United States Patent [19]

Gilliam

[11] Patent Number: 5,247,443
[45] Date of Patent: Sep. 21, 1993

[54] ELECTRONIC CONTROL FOR VEHICLE FOUR WHEEL DRIVE SYSTEM

[75] Inventor: Bradley T. Gilliam, Toledo, Ohio

[73] Assignee: Dana Corporation, Toledo, Ohio

[21] Appl. No.: 967,938

[22] Filed: Oct. 28, 1992

Related U.S. Application Data

[63] Continuation of Ser. No. 544,184, Jun. 26, 1990, abandoned, which is a continuation-in-part of Ser. No. 137,394, Dec. 23, 1987, Pat. No. 4,937,750.

[51] Int. Cl.$^5$ ............................................. B60K 17/35
[52] U.S. Cl. ..................... 364/424.05; 364/424.1; 364/426.01; 180/249
[58] Field of Search .......... 364/424.01, 424.1, 426.02, 364/426.03, 426.01, 424.05; 180/233, 248, 249

[56] References Cited

U.S. PATENT DOCUMENTS

| | | | |
|---|---|---|---|
| 3,827,520 | 8/1974 | Mueller | 180/249 |
| 4,493,387 | 1/1985 | Lake et al. | 180/248 |
| 4,552,241 | 11/1985 | Suzuki | 180/249 |
| 4,566,554 | 1/1986 | Suzuki | 180/249 |
| 4,671,377 | 1/1987 | Ehrlinger et al. | 180/249 |
| 4,714,127 | 12/1987 | Fanti et al. | 180/233 |
| 4,718,515 | 1/1988 | Fanti et al. | 180/233 |
| 4,781,266 | 11/1988 | Hotta et al. | 180/248 |
| 4,886,141 | 12/1989 | Ikegami et al. | 180/233 |
| 4,937,750 | 6/1990 | Gilliam | 364/424.1 |

Primary Examiner—Thomas G. Black
Assistant Examiner—Collin W. Park
Attorney, Agent, or Firm—MacMillan, Sobanski & Todd

[57] ABSTRACT

A microcomputer-based electronic control system for a full time four wheel drive torque transfer case monitors the relative slip between the front and rear output shafts of the transfer case, and generates a signal to engage an electromagnetic clutch for a predetermined time period in the event a first predetermined slip threshold is exceeded. In the event the driver has actuated the vehicle service brakes, the electromagnetic clutch is only engaged if the relative slip is less than a second predetermined slip threshold greater than the first predetermined slip threshold.

6 Claims, 2 Drawing Sheets

ELECTRONIC CONTROL FOR VEHICLE FOUR WHEEL DRIVE SYSTEM

CROSS REFERENCE TO RELATED APPLICATION

This application, filed Jun. 26, 1990, is a continuation of U.S. patent application Ser. No. 07/544,184, now abandoned, which is a continuation-in-part of U.S. patent application Ser. No. 137,394, filed Dec. 23, 1987, now U.S. Pat. No. 4,937,750, and herein incorporated by reference.

BACKGROUND OF THE INVENTION

The present invention relates generally to an electronic control for a vehicle four wheel drive system and, in particular, to an electronic control which includes means for detecting a predetermined slip (speed differential) between the front and rear wheels of the vehicle, and means for selectively engaging a clutch during excessive slip conditions to prevent relative slip between the front and rear wheels.

Four wheel drive systems for vehicles are becoming increasingly common. In the past, such systems typically included a torque transfer case having an input shaft connected to the output of the vehicle transmission, and front and rear output shafts connected to the front and rear differentials of the vehicle for driving the front and rear wheels respectively. Typically, such systems were provided with selective control means operable by the vehicle driver for selecting whether the vehicle is to be operated in either a two wheel or a four wheel drive mode. When operated in the four wheel drive mode, these systems did not provide for any speed differentiation between the front and rear wheels such that, on dry pavement, "hopping" of the front wheels would occur during turning of the vehicle, due to the normal overspinning of the front wheels. Consequently, it was recommended that the four wheel drive mode be used only during wet, icy, or low traction road surface conditions.

Recently, certain vehicles have been provided with a "full time" four wheel drive system. In these systems, the torque transfer cases are typically provided with an interaxle differential for dividing torque between the vehicle front and rear differentials. The interaxle differential enables the front and rear wheels to rotate at different speeds, which occurs during turning of the vehicle, or in the event the front and rear wheels have different diameter tires. Also, in order to prevent excessive slipping between the front and rear wheels, these transfer cases typically include a selectively engageable clutch means which is operative to lock the interaxle differential upon sensing a predetermined slippage between the front and rear output shafts of the transfer case.

SUMMARY OF THE INVENTION

The present invention concerns a microcomputer-based electronic control system for automatically controlling a full-time four wheel drive torque transfer case. The transfer case includes an input shaft coupled to the output of the vehicle transmission, and an interaxle planetary gear differential for dividing torque between a rear output shaft connected to the vehicle rear differential and a front output shaft connected to the vehicle front differential. An electromagnetic clutch is located in the transfer case and is adapted to selectively lock the planetary gear differential to prevent relative slip between the front and rear output shafts. When a predetermined amount of slip is detected between the front and rear output shafts, the electronic is operative to selectively engage the electromagnetic clutch for a predetermined time period. During this predetermined time period, the clutch is engaged to lock the differential and prevent slip between the front and rear output shafts.

In accordance with the present invention, the engagement of the clutch is dependent on whether the driver has actuated the vehicle service brakes. If the relative slip between the front and rear output shafts exceeds a first predetermined slip threshold, and the vehicle service brakes are not actuated, then the clutch is engaged. However, if the vehicle service brakes are applied, the relative slip must not only be above the first slip threshold, but also must be below a second predetermined slip threshold which is greater than the first slip threshold to allow the clutch to be engaged. If the vehicle service brakes are actuated while the clutch is engaged, and the relative slip is above the second slip threshold, the clutch is disengaged. While such a control feature can be incorporated into any electronically controlled four wheel drive system, it has been found especially desirable in vehicles which include an anti-lock brake system which controls only the rear wheels of the vehicle, such as the one disclosed in U.S. Pat. No. 4,673,226, which is herein incorporated by reference.

The above, as well as other advantages of the present invention, will become readily apparent to one skilled in the art from reading the following detailed description in conjunction with the attached drawings.

DESCRIPTION OF THE PREFERRED EMBODIMENT

Figure 1:
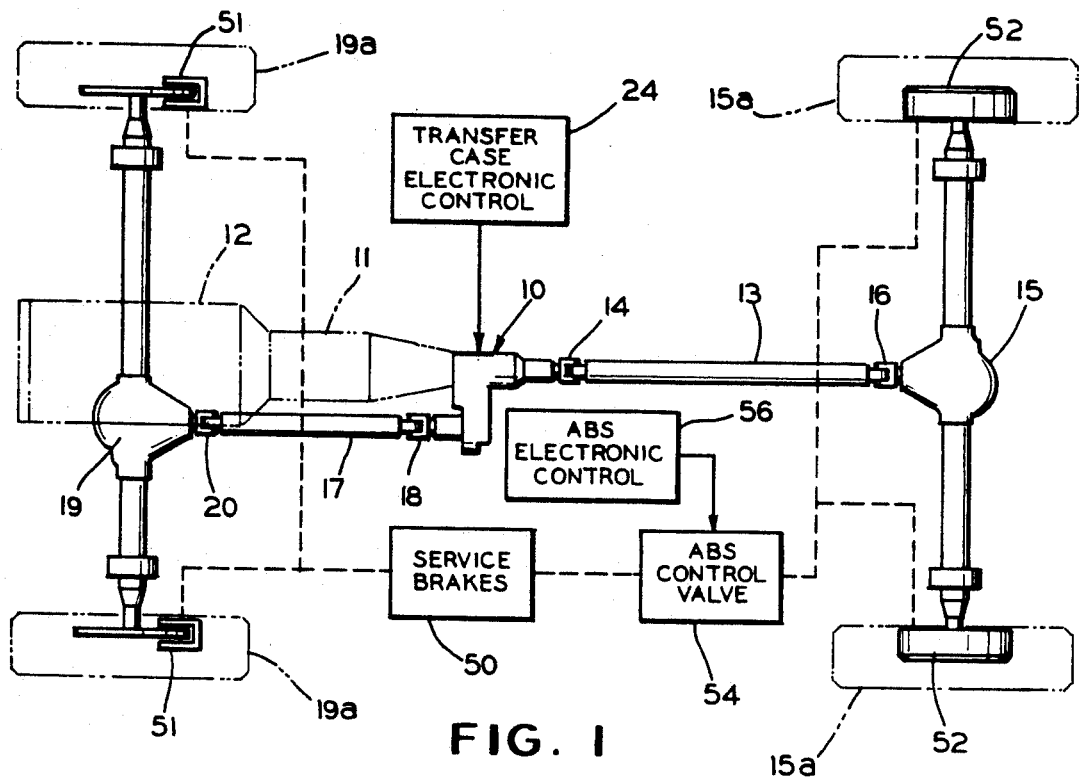
FIG. 1 is a top plan view of a four wheel drive system having a torque transfer case which can be controlled with the electronic control of the present invention.

Referring first to FIG. 1, there is shown a vehicle four wheel drive system which utilizes a torque transfer case 10 which can be controlled by the electronic control of the present invention. The transfer case 10 is secured to the rear of a transmission unit 11 (shown in phantom) which in turn is coupled to a drive engine 12 (also in phantom). The transmission 11 is provided with an output shaft which is coupled to an input shaft of the transfer case 10. The transfer case 10 includes a rear output shaft connected to the front end of a rear drive shaft 13 by means of a conventional universal joint coupling 14. The rear end of the drive shaft 13 is coupled to an input shaft of a rear differential 15 by means of a universal joint coupling 16. The rear differential 15 is adapted to divide torque from the drive shaft 13 between the rear wheels 15a.

The transfer case 10 is provided with a front output shaft which is connected to the rear end of a front drive shaft 17 by means of a universal joint coupling 18. The front drive shaft 17 has a front end connected to an input shaft of a front differential 19 by means of a universal joint coupling 20. The front differential is adapted to divide torque received from the drive shaft 17 between the vehicle front wheels 19a.

Also shown schematically in FIG. 1 is a vehicle brake system which includes conventional service brakes 50 operated by the vehicle driver and connected directly to the front brakes 51 and is connected to the rear brakes 52 through an anti-lock brake (ABS) control valve 54. The valve 54 is controlled by an ABS electronic control 56. A detailed explanation of the operation of the ABS system, which controls only the rear brakes of the vehicle, can be found in above mentioned U.S. Pat. No. 4,673,226.

Figure 2:
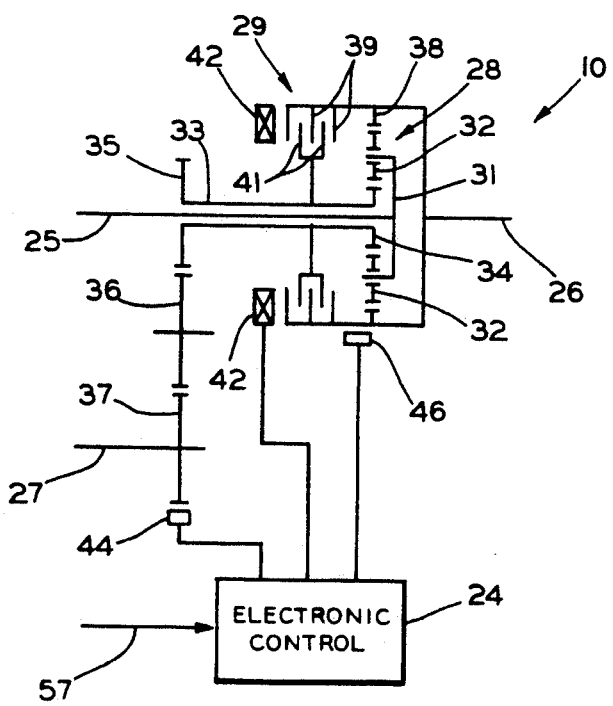
FIG. 2 is a schematic view illustrating the internal components of a transfer case which can utilize the electronic control of the present invention.

Referring now to FIG. 2, the internal components of the transfer case 10 are schematically shown, along with certain electrical connections to an electronic control which is represented in FIG. 2 as a block 24. In accordance with the present invention, one of the connections to the control 24 is generated on a line 57, which signals the control as to whether the vehicle service brakes have been actuated. This signal is typically derived from the vehicle stop light switch, which is actuated immediately when the driver depresses the brake pedal.

As shown in FIG. 2, the transfer case 10 includes an input shaft 25 coupled to the output shaft of the vehicle transmission 11 (shown in FIG. 1). The transfer case 10 also includes a rear output shaft 26 adapted to be connected to the rear drive shaft 13, and a front output shaft 27 for connection to the front drive shaft 17. The transfer case utilizes an interaxle planetary gear differential, generally indicated by the reference numeral 28, for dividing torque between the rear output shaft 26 and the front output shaft 27. Also, an electromagnetic friction clutch, generally represented by the reference numeral 29, is provided for selectively locking the planetary gear differential to prevent any slip between the front and rear output shafts.

In particular, the input shaft 25 is secured to a planet carrier 31 which carries a plurality of circumferentially spaced and individually rotatable planet gears 32. A sleeve member 33 is rotatably mounted about the input shaft 25 and has one end which carries a sun gear 34 of the planetary gear differential 28 and an opposite end which carries a first output gear 35. The first output gear is connected to drive a second intermediate output gear 36 which in turn drives a third output gear 37 secured to the front output shaft 27. A ring gear 38 of the planetary gear differential 28 is secured to the rear output shaft 26.

The electromagnetic clutch assembly 29 includes a first group of clutch plates 39 which are secured for rotation with the ring gear 38, and a second group of clutch plates 41 which are secured to the sleeve member 33 for rotation with the sun gear 34. An annular clutch coil 42 is positioned adjacent the clutch plates 39 and 41 and is adapted to receive a clutch engagement signal on a line 43 from the electronic control 24. The electromagnetic clutch 29 has a construction wherein, when a clutch engagement signal is generated to energize the coil 42, the magnetic field generated by the energized coil 42 exerts a magnetic force to urge the clutch plates 39 and 41 into frictional engagement with one another to prevent relative rotation therebetween, thus locking the sun gear 34 and the ring gear 38 together. This prevents any relative slip between the front and rear output shafts.

The speed of the front output shaft is monitored by a speed sensor 44 which can be positioned adjacent the periphery of the teeth of the front output gear 37. The speed sensor 44 generates a front output shaft speed signal to the electronic control 24. Similarly, the speed of the rear output shaft 26 is monitored by a speed sensor 46 which can be positioned adjacent the periphery of the ring gear 38, and can be adapted to sense a plurality of circumferential speed external teeth provided about the periphery of the ring gear. The speed sensor 46 generates a rear output shaft speed signal to the electronic control 24.

As previously mentioned, the planetary gear differential 28 is provided for dividing torque between the rear output shaft 26 and the front output shaft 27. Normally, the clutch coil 42 is not energized such that a predetermined slippage can occur between the front and rear output shafts to accommodate slightly different front and rear wheel speeds which occur during normal traction conditions such as when turning the vehicle. However, as will be discussed in more detail below, when slippage between the front and rear wheels exceeds a predetermined amount, the electronic control 24 will generate a clutch engagement signal which causes the planetary gear differential to lock and provide a direct drive connection between the input shaft 25 and the front and rear output shafts 26 and 27. In particular, when the clutch coil 42 is energized, the ring gear 38 is locked relative to the sun gear 34 to prevent relative rotation therebetween. When the ring gear 38 is locked relative to the sun gear 34, the planet gears 32 are prevented from rotating about their associated shafts, thereby preventing rotation of the planet carrier 31 relative to either the ring gear 38 or the sun gear 34.

It should be noted that the transfer case illustrated in FIG. 2 is only one example of a transfer case which can utilize the electronic control of the present invention, and that other transfer cases which use a selectively engageable clutch means can be operated by the electronic control 24.

Figure 3:
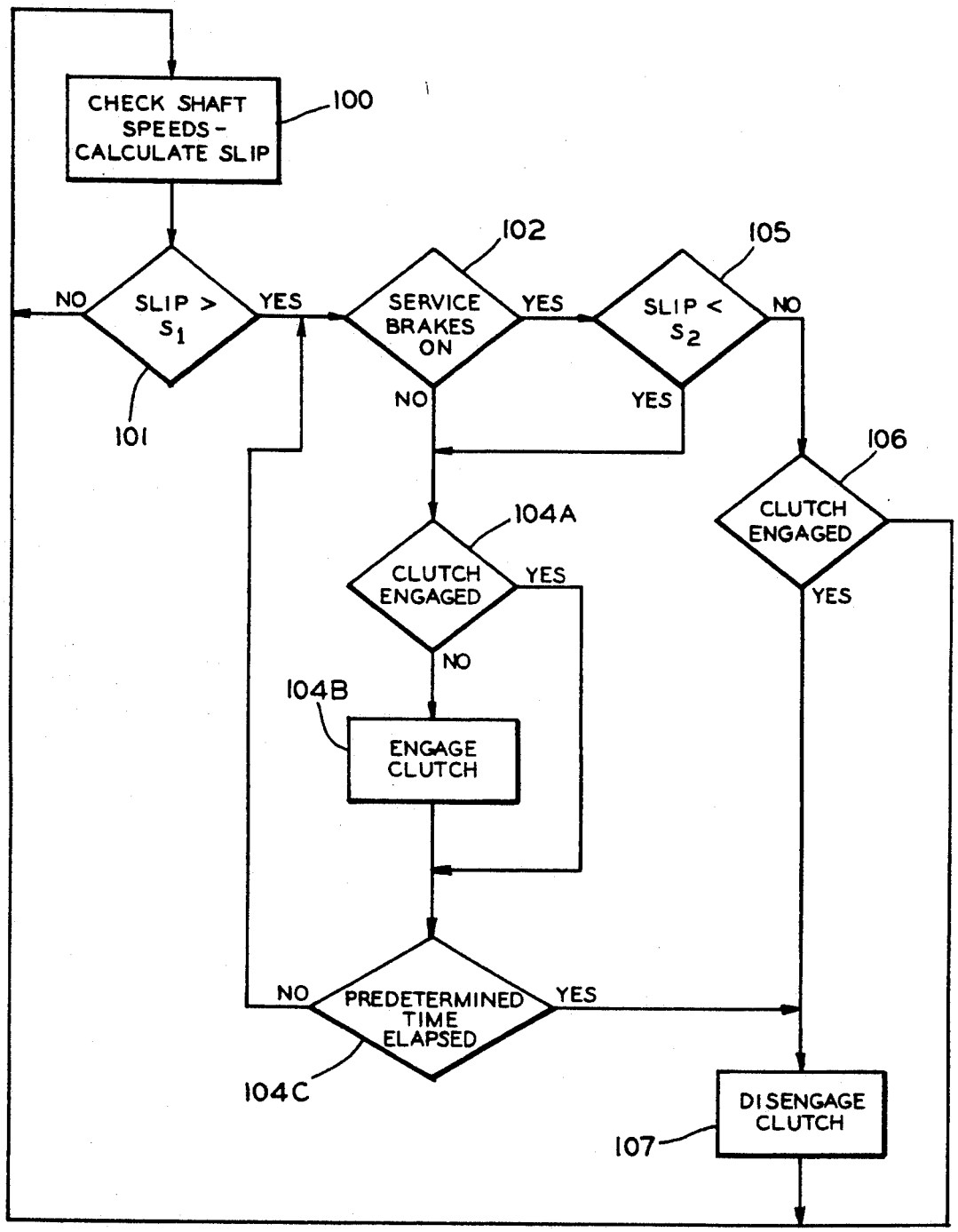
FIG. 3 is a flow diagram which illustrates the operation of the electronic control of the present invention in automatically controlling the transfer case of FIG. 2.

Referring now to FIG. 3, there is shown a flow diagram which will be utilized to explain the operation of the electronic control. It should be noted that the flow diagram illustrated in FIG. 3 represents only a portion of the control functions of the electronic control, and that a more detailed description of the electronic control can be found in above-mentioned U.S. Pat. No. 4,937,750. Initially, the program is in a processing function 100 wherein the control determines the speeds of the front output shaft 27 and the rear output shaft 26, and calculates any relative slip therebetween. Thereafter, the program enters a decision point "SLIP>$S_1$" at 101 to determine whether the relative slip is above a predetermined threshold $S_1$. If the relative slip is not above this threshold, the program branches at "NO" and returns to the processing function 100 to again sample the shaft speeds and recalculate the relative slip. However, if the slip is greater than the slip threshold $S_1$, the program branches at "YES" and enters a decision point 102 labeled "SERVICE BRAKES ON" to determine whether the driver has actuated the service brakes. If the service brakes are not actuated, the program branches at "NO" and enters a decision point 104A labeled "CLUTCH ENGAGED" to determine whether the clutch is presently engaged. If the clutch is not engaged, the program branches at "NO" and enters a processing function 104B wherein the electromagnetic clutch 29 is engaged. As discussed in the abovereferenced U.S. Pat. No. 4,937,750, the clutch can be engaged for a predetermined time period. Once the clutch 29 is engaged in processing function 104B, the program enters decision point 104C to determine if the predetermined time has elapsed. If the time has not elapsed, the program branches at "NO" to return to decision point 102 to again determine whether the driver has actuated the service brakes. If the predetermined time has elapsed, the program branches at "YES" to enter a processing function 107 labeled "DISENGAGE CLUTCH" wherein the engagement signal to the clutch is discontinued. The program then returns to processing function 100 to again sample the shaft speeds and recalculate the relative slip. If the clutch is already engaged when decision point 104A is entered, the program branches at "YES" and enters the decision point 104C to determine whether the predetermined time has elapsed.

If the driver has actuated the vehicle service brakes, the program branches at "NO" at decision point 102 and enters a decision point 105 labeled "SLIP<S₂" to determine whether the relative slip is below a second predetermined threshold $S_2$, which is greater than the first slip threshold $S_1$. If the slip is less than the second threshold $S_2$, the program branches at "YES" and enters the decision point 104A to determine whether the clutch is presently engaged. However, if the slip is greater than the threshold $S_2$, the program branches at "NO" and enters a decision point 106 labeled "CLUTCH ENGAGED" to determine whether the clutch is presently engaged. If the clutch is not engaged, the program branches at "NO" and returns to the processing function 100. However, if the clutch is engaged, the program branches at "YES", and enters the processing function 107 labeled "DISENGAGE CLUTCH".

While the control of the present invention is applicable to any vehicle brake system, whether or not the vehicle is equipped with an anti-lock brake control system, the present invention has been found especially useful in vehicles equipped with a "rear wheel only" anti-lock brake system.

The present invention has been illustrated and described in its preferred embodiment. However, it will be appreciated that the above described embodiment of the electronic control can be modified without departing from the scope of the attached claims. For example, while the above discussed control is utilized to selectively control the engagement of an electro-magnetic clutch, it will be appreciated that the electro-magnetic clutch can be replaced with either a hydraulically or other fluid actuated clutch which in turn can be controlled by electrically actuated solenoid valves.

What is claimed is:

1. A method for controlling a four-wheel drive system for a vehicle having driver actuated service brakes and including a torque transfer unit having a driven input shaft coupled to an interaxle differential which divides torque between front and rear output shafts coupled to drive the front and rear wheels of the vehicle respectively, the transfer unit including a selectively engageable differential locking clutch responsive to a clutch engagement signal for locking said interaxle differential to prevent relative slip between said front and rear output shafts, said method comprising the steps of:
   (a) monitoring the relative slip between the front and rear output shafts;
   (b) monitoring whether the service brakes are unactuated or actuated;
   (c) generating said clutch engagement signal if the relative slip obtained in step (a) is greater than a first predetermined slip threshold and the service brakes are unactuated; and
   (d) generating said clutch engagement signal when the service brakes are actuated only if the relative slip obtained in step (a) is greater than the first predetermined slip threshold and less than a second predetermined slip threshold greater than the first predetermined slip threshold.

2. The method of claim 1 including, subsequent to step (c), the step of discontinuing the generation of said clutch engagement signal if the service brakes are actuated and the relative slip is greater than the second predetermined slip threshold.

3. A method for controlling a four-wheel drive system for a vehicle having driver-actuated service brakes and including a torque transfer unit having a driven input shaft coupled to an interaxle differential which divides torque between front and rear output shafts coupled to drive the front and rear wheels of the vehicle respectively, the transfer unit including a selectively engageable differential locking clutch responsive to a clutch engagement signal for locking said interaxle differential to prevent relative slip between said front and rear output shafts, said method comprising the steps of:
   (a) monitoring the relative slip between the front and rear output shafts;
   (b) monitoring whether the service brakes are unactuated or actuated;
   (c) generating said clutch engagement signal if the relative slip obtained in step (a) exceeds a first predetermined slip threshold; and
   (d) discontinuing the generation of said clutch engagement signal whenever the service brakes are actuated and the relative slip is greater than a second predetermined slip threshold greater than the first predetermined slip threshold.

4. An electronic control for a vehicle four-wheel drive system having driver actuated service brakes and including a torque transfer unit having a driven input shaft coupled to an interaxle differential which divides torque between front and rear output shafts, the transfer unit including a selectively engageable differential locking clutch responsive to a clutch engagement signal for locking said interaxle differential to prevent relative slip between said front and rear output shafts, said control comprising:
   (a) means for monitoring the relative slip between the front and rear output shafts;
   (b) means for monitoring whether the service brakes are unactuated or actuated;
   (c) means for generating said clutch engagement signal if the relative slip obtained in step (a) is greater than a first predetermined slip threshold and the service brakes are unactuated; and
   (d) means for generating said clutch engagement signal when the service brakes are actuated only if the relative slip obtained in step (a) is greater than the first predetermined slip threshold and less than a second predetermined slip threshold greater than the first predetermined slip threshold.

5. The electronic control according to claim 4 wherein the vehicle includes an anti-lock brake system.

6. The electronic control according to claim 5 wherein the anti-lock brake system controls only the rear wheels of the vehicle.

* * * * *